United States Patent [19]

Ogawa et al.

[11] Patent Number: 4,708,915
[45] Date of Patent: Nov. 24, 1987

[54] THERMAL HEAD FOR THERMAL RECORDING

[75] Inventors: Motokazu Ogawa, Hayato; Yasuo Nishiguchi, Kokubu; Keijiro Minami, Hayato, all of Japan

[73] Assignee: Kyocera Corporation, Kyoto, Japan

[21] Appl. No.: 821,681

[22] Filed: Jan. 23, 1986

[30] Foreign Application Priority Data

Jan. 26, 1985 [JP] Japan ................... 60-12853

[51] Int. Cl.$^4$ .................. G01D 15/10; B47J 3/20
[52] U.S. Cl. .................... 428/698; 428/703; 501/134; 501/63; 360/127; 346/76 PH; 219/543
[58] Field of Search ............. 428/698, 699, 701, 703, 428/446; 501/63, 134; 360/127; 346/76 PH; 219/543

[56] References Cited

U.S. PATENT DOCUMENTS

| 3,031,318 | 4/1962 | Rao | 501/63 X |
|---|---|---|---|
| 3,537,868 | 11/1970 | Kosaka et al. | 501/63 X |
| 3,630,765 | 12/1971 | Arajo | 501/63 X |
| 3,717,441 | 2/1973 | Rapp | 501/63 |
| 4,168,343 | 9/1979 | Arai et al. | 219/543 |
| 4,232,213 | 11/1980 | Taguchi et al. | 219/543 X |
| 4,536,645 | 8/1985 | Mio et al. | 219/543 |
| 4,595,823 | 6/1986 | Sorimachi et al. | 219/543 X |
| 4,608,293 | 8/1986 | Wada et al. | 428/701 X |
| 4,614,689 | 9/1986 | Ikeda et al. | 428/698 X |
| 4,650,726 | 3/1987 | Yamaguchi et al. | 428/694 |

FOREIGN PATENT DOCUMENTS 0119811  9/1984  European Pat. Off. .

Primary Examiner—Nancy A. Swisher
Attorney, Agent, or Firm—Spensley Horn Jubas & Lubitz

[57] ABSTRACT

Disclosed is a thermal head comprising a protecting film composed of tantalum silicon oxynitride. An undercoat film may be formed between this protecting film and heat-generating resistors and electrodes. This protecting film is excellent in the abrasion resistance and oxygen barrier property and acts as an excellent barrier to alkali metal ions to be injected into the head from a heat-sensitive recording paper.

13 Claims, 2 Drawing Figures

THERMAL HEAD FOR THERMAL RECORDING

BACKGROUND OF THE INVENTION (1) Field of the Invention

The present invention relates to a thermal head for thermal recording. More particularly, the present invention relates to a thermal head having a protecting film which is excellent in the abrasion resistance, the oxygen barrier property and the barrier property against injected ions.

(2) Description of the Prior Art

A thermal head is used as a recording device of an apparatus such as a facsimile apparatus or a printer and attains an effect of reducing the size and weight of the apparatus, a maintenance-free effect, an effect of improving the reliability of the apparatus and an effect of reducing the price of the apparatus, and the thermal head makes a great contribution to development of the apparatus.

A conventional thermal head has a structure in which a heat-generating resistor composed of tantalum nitride ($Ta_2N$) or the like and an electrode composed of aluminum (Al) or copper (Cu) are laminated in sequence on a substrate composed of an electrically insulating material such as alumina or glass, and a certain electric power is applied to the heat-generating resistor through the electrode to generate Joule heat and exert the function of the thermal head.

In this conventional thermal head, a protecting film having a two-layer structure composed of silicon oxide ($SiO_2$) and tantalum pentoxide ($Ta_2O_5$) or a protecting film having a single layer structure composed of silicon oxynitride ($SiN_xO_y$; $1.33>x>0$ and $2>y>0$) is formed on the outer surfaces of the heat-generating resistor and electrode to protect the heat-generating resistor and electrode from the abrasion by contact with a heat-sensitive recording paper or heat transfer ribbon and also from oxidation by contact with oxygen in air.

In this conventional thermal head, however, in case of a protecting film having a two-layer structure composed of silicon oxide ($SiO_2$) and tantalum pentoxide ($Ta_2O_5$), tantalum pentoxide ($Ta_2O_5$) is relatively low in the hardness and inferior in the abrasion resistance and silicon oxide ($SiO_2$) is insufficient in the oxidation-preventing property and is chemically unstable. For example, silicon oxide reacts with a heat-sensitive substance on the heat-sensitive recording paper to drastically degrade the abrasion resistance, with the result that the abrasion by sliding contact with the heat-sensitive recording paper is great in this protecting film and the thermal head cannot be used for a long time. Furthermore, the heat-generating resistor and electrode are oxidized and corroded by oxygen in air, and the resistance value of the heat-generating resistor is changed or the electrode line is broken, with the result that uneven printing density or insufficient printing is caused and the printing performance is drastically degraded.

In case of a protecting film having a single layer structure of silicon oxynitride ($SiN_xO_y$; $1.33>x>0$ and $2>y>0$), since silicon oxynitride has a high hardness and is excellent in the oxidation resistance, the abrasion by sliding contact with a heat-sensitive recording paper is reduced and the oxidative corrosion of the heat-generating resistor and electrode is effectively prevented. However, since ions are readily diffused in this silicon oxynitride, when the protecting film is brought into sliding contact with a heat-sensitive recording paper or a heat transfer ribbon, $Na^+$ ions or $K^+$ ions contained in the heat-sensitive recording paper or heat transfer ribbon are diffused in the protecting film, and these ions act on electrodes, especially earth electrodes, to cause breaking of electrode lines, with the result that supply of electric power to the heat-generating resistor becomes impossible and the function of the thermal head is compeltely lost.

SUMMARY OF THE INVENTION

We made various experiments with a view to overcoming the foregoing defects, and as the result, it was found that if a predetermined amount of tantalum (Ta) is added to silicon oxynitride which is excellent in the abrasion resistance and the oxidation resistance, the ion diffusion preventing property (ion resistance) can be highly improved without degradation of the characteristics of silicon oxynitride. We have now completed the present invention based on this finding.

It is therefore a primary object of the present invention to provide a thermal head in which the abrasion of the heat-generating resistor and electrode by contact with a heat-sensitive recording paper or the like and the corrosive breaking of electrode lines can be completely eliminated and printing can be performed stably for a long time.

Namely, the present invention provides a thermal head for thermal recording, which comprises a dense film of tantalum silicon oxynitride as a protecting film.

More specifically, in accordance with the present invention, there is provided a thermal head for thermal recording, which comprises a substrate, heat-generating resistors formed on the substrate, electrodes for supplying electric power to the heat-generating resistors and a protecting film covering the heat-generating resistors and electrodes, wherein the protecting film is a dense film having an average chemical composition represented by the following formula:

$$Ta_xSiN_yO_z \qquad (1)$$

wherein x is a number of from 0.1 to 1, y is a positive number smaller than 1.33, z is a positive number smaller than 2, and x, y and z substantially satisfy the requirement of $3y+2z-nx=4$ (in which n is a number of from 2 to 5).

In accordance with one preferred embodiment of the present invention, there is provided a thermal head as set forth above, wherein an undercoat film composed of silicon oxynitride is formed between the protecting film and the heat-generating resistors and electrodes.

The tantalum silicon oxynitride protecting film of the present invention may be formed by a film-forming technique, preferably according to a sputtering method.

Figure 1:
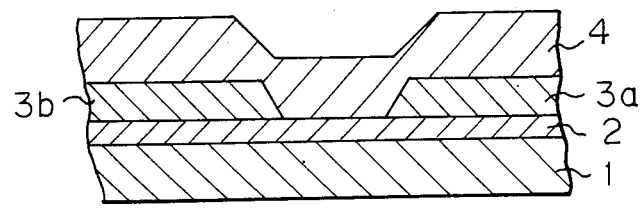
FIG. 1 is a sectional view illustrating one embodiment of the thermal head according to the present invention.

In the drawings, reference numeral 1 represents an insulating substrate, reference numeral 2 represents a heat-generating resistor, reference numeral 3 represents an electrode, reference numeral 4 represents a protecting film, reference numeral 11 represents a vacuum vessel, each of reference numerals 12a and 12b represents a cathode, reference numeral 13 represents an anode, and each of reference numerals 14 and 15 represents a target.

DETAILED DESCRIPTION OF THE PREFERRED EMBODIMENTS

FIG. 1 illustrates one embodiment of the thermal head according to the present invention, and reference numeral 1 represents a substrate composed of a sintered ceramic material such as alumina or other electrically insulating material.

A heat-generating resistor 2 is attached on the isulating substrate 1 and an electrode 3 is attached to the heat-generating resistor 2.

The heat-generating resistor 2 is composed of tantalum nitride ($Ta_2N$), nichrome (Ni—Cr), ruthenium oxide ($RuO_2$) or the like and is formed on the insulating substrate 1 according to a known film-forming method such as the vacuum deposition method, the sputtering method or the screen printing method. This heat-generating resistor 2 has a predetermined electric resistivity and when certain electric power is applied to the heat-generating resistor 2, Joule heat is generated and the temperature is elevated to a level necessary for printing, for example, 300° to 400° C.

The electrode (individual electrode 3a and common electrode 3b) is formed on the heat-generating resistor 2. The electrode 3 is disposed to apply electric power to the heat-generating resistor 2 for generating Joule heat. The electrode 3 is formed of a metal such as aluminum (Al) or copper (Cu), and the electrode 3 is capped on the heat-generating resistor 2 by a known film-forming technique.

According to the present invention, a film 4 composed of amorphous tantalum silicon oxynitride is formed as the protecting film on the outer surfaces of the heat-generating resistor 2 and electrode 3. This film is formed according to a known film-forming technique, for example, sputtering. This tantalum silicon oxynitride is excellent in the ion resistance and oxidation resistance, and therefore, even if the protecting film 4 is brought into sliding contact with a heat-sensitive recording paper or heat transfer ribbon, the protecting film is not worn and diffusion of oxygen or ions is completely intercepted, and the heat-generating resistor 2 or electrode 3 is effectively prevented from being corroded by oxygen or ions. Accordingly, the electric resistance of the heat-generating resistor 2 can always be maintained at a constant level and breaking of the line of the electrode 3 can be completely prevented.

In order to attain these functional effects, it is indispensable that the protecting film of the present invention should be composed of Ta, Si, N and O. If any one of these four elements is not included, the intended effects cannot be attained. More specifically, if the tantalum component is not present, the protecting film is poor in the ion resistance and $Na^+$ ions or $K^+$ ions contained in a heat-sensitive recording paper or heat transfer ribbon are diffused in the protecting film 4 to cause corrosive breaking of lines of electrodes, especially electrodes on the earth side. If the nitrogen component is not present, the abrasion resistance and oxygen barrier property of the protecting film 4 are degraded and the abrasion by sliding contact with a heat-sensitive recording paper or the like is increased, and simultaneously, the heat-generating resistor and electrode undergo oxidative corrosion and the resistance value of the heat-generating resistor is changed, with the result that line breaking of the electrode or insufficient printing is caused. If the oxygen component is not present, the oxidation-prevention property of the protecting film is degraded and the adhesion between the heat-generating resistor and electrode is reduced, and the heat-generating resistor and electrode undergo oxidative corrosion to cause insufficient printing. Furthermore, if a stress is applied from the outside at the printing step, the protecting film is peeled from the surfaces of the heat-generating resistor and electrode by this stress and the function of the protecting film is lost.

From the foregoing viewpoint, it is preferred that the tantalum silicon oxynitride used in the present invention should have a chemical composition represented by the above-mentioned formula (1). The reason why n is a number of from 2 to 5 is that tantalum can have a valency of from 2 to 5. It is especially preferred that in the above formula (1), x be in the range of from 0.3 to 0.7, y be in the range of from 0.2 to 1.2 and z be in the range of from 0.5 to 1.5.

Figure 2:
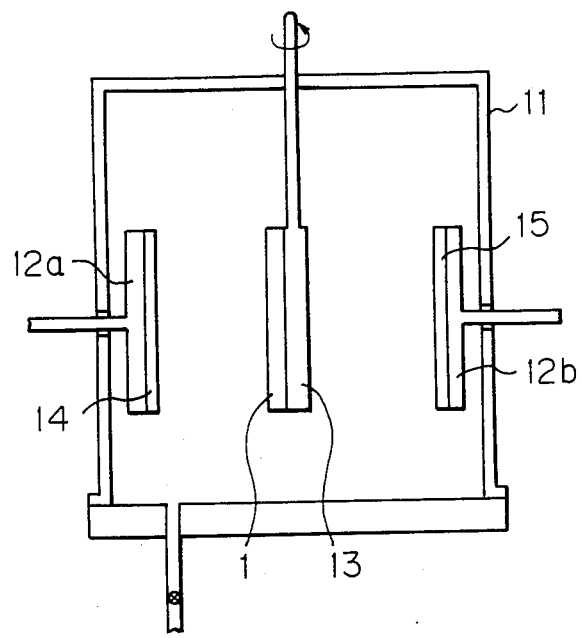
FIG. 2 is a sectional view illustrating a high-frequency sputtering apparatus for forming a protecting film in the thermal head of the present invention.

The tantalum silicon oxynitride used in the present invention is formed by co-sputtering of (i) tantalum oxide and (ii) silicon nitride and/or silicon oxynitride, and a high-frequency sputtering apparatus as shown in FIG. 2 is used for this purpose. In this high-frequency sputtering apparatus, two cathodes 12a and 12b and an anode 13 are arranged in a vacuum vessel 11.

When the protecting film 4 is formed by using this high-frequency sputtering apparatus, a target 14 composed of silicon nitride ($Si_3N_4$) or silicon oxynitride ($SiN_\alpha O_\beta$) ($0<\alpha<1.33$, $0<\beta<2$, $3\alpha+2\beta=4$) is attached to one cathode 12a and a target 15 composed of Ta or $Ta_2O_5$ is attached to the other cathode 12b, and the insulating substrate 1 having the heat-generating resistor 2 and electrode 3 formed on the surface thereof is attached to the anode 13. Then, the pressure in the vacuum vessel 11 is reduced to about $5 \times 10^{-3}$ Torr and argon gas containing $O_2$ is filled in the vacuum vessel 11, and high-frequency electric power (5 MHz, 3 KW) is applied between the cathodes 12a and 12b and the anode 13 to release $Ar^+$ ions and $O^+$ ions. These ions are bombarded to the targets 14 and 15 to scatter parts of the tragets 14 and 15, whereby tantalum silicon oxynitride $Ta_xSiN_yO_z$ is formed on the surface of the insulating substrate 1. Thus, a protecting film 4 is formed and capped on the outer surfaces of the heat-generating resistor 2 and electrode 3 of the insulating substrate 1.

In order to protect the electrode 3 from $Na^+$ ions or $K^+$ ions contained in a heat-sensitive recording paper or the like or to effectively transfer heat generated by the heat-generating resistor 2 to a heat-sensitive recording paper, it is preferred that the thickness of the protecting film 4 be 1 to 8 microns.

In order to completely prevent oxidation of the heat-generating resistor 2 and electrode 3, it is preferred that an undercoat film composed of silicon oxynitride $SiN_\alpha O_\beta$ ($\alpha$ and $\beta$ are as defined above) be formed in a thickness of 200 Å to 1 micron below the protecting film 4. In this case, the undercoat film of silicon oxynitride has a very good compatibility with tantalum silicon oxynitride of the protecting film 4 and a good adhesion to the protecting film 4. Accordingly, peeling is not caused even if an external stress or the like is applied. Furthermore, this undercoat film can be easily prepared by applying high-frequency electric power only between the cathode 12a and the anode 13 to scatter a part of the target 14 attached to the cathode 12a before formation of the protecting film 4.

Silicon oxynitride having a composition in which α is 0.2 to 1.1 and β is 0.3 to 1.8 is preferred. In the present invention, the protecting film composed of tantalum silicon oxynitride may have a uniform composition in the entire thickness direction, or it may have a certain tantalum conncentration gradient in the thickness direction, so far as the above-mentioned requirement of the composition is satisfied. For example, the protecting film may comprise a lower layer composed of tantalum silicon oxynitride having a relatively low tantalum concentration and an upper composed of tantalum silicon oxynitride having a relatively high tantalum concentration, or the protecting film may comprise upper and lower layers composed of tantalum silicon oxynitride having a relatively low tantalum concentration and an intermediate layer composed of tantalum silicon oxynitride having a relatively high tantalum concentration. A protecting film having such a concentration gradient can be easily obtained by changing electric power-applying conditions in the targets 14 and 15.

In the thermal head of the present invention, by using tantalum silicon oxynitride excellent in the abrasion resistance, ion resistance and oxidation-preventing property for the protecting film, the abrasion by sliding contact with a heat-sensitive recording paper or the like is drastically reduced and corrosion of the heat-generating resistor or electrode by $Na^+$ ions or $K^+$ ions contained in a heat-sensitive recording paper or the like or by oxygen contained in air can be completely prevented. Accordingly, the electric resistance of the heat-generating resistor and the electric power to be applied to the heat-generating resistor are always kept constant, and printing can be performed very stably for a long time.

We claim:

1. A thermal head for thermal recording, which comprises a protecting film composed of amorphous tantalum silicon oxynitride, which is formed by a film-forming method.

2. A thermal head for thermal recording, comprising:
a substrate;
a heat-generating resistor formed on the substrate;
electrodes electrically coupled to the heat-generating resistor for supplying electric power to the heat-generating resistor; and
a protecting film covering the heat-generating resistor and electrodes, wherein the protecting film is formed as a dense film consisting essentially of an overall chemical composition represented by the following formula:
$Ta_xSiN_yO_z$, wherein
$0.3 \leq x \leq 0.7$,
$0.2 \leq y \leq 1.2$,
$0.5 \leq z \leq 1.5$, and wherein $3y+2z-nx=4$, and $2 \leq n \leq 5$.

3. A thermal head as set forth in claim 2, wherein the protecting film is formed by co-sputtering a combination of (i) a member selected from the group consisting of tantalum and tantalum oxide and (ii) at least one member selected from the group consisting of silicon nitride and silicon oxynitride.

4. A thermal head as set forth in claim 2, wherein the protecting film has a thickness of 1 to 8 microns.

5. A thermal head for thermal recording according to claim 1, wherein the values of x, y and z are uniform throughout the thickness of the protecting film.

6. A thermal head for thermal recording according to claim 1, wherein the values of x, y and z vary at different points of thickness within the protecting film.

7. A thermal head for thermal recording, comprising:
a substrate;
a heat-generating resistor formed on the substrate;
electrodes electrically coupled to the heat-generating resistor for supplying electrical power to the heat generating resistor; and
a layer of amorphous tantalum silicon oxynitride formed over the heat-generating resistor and electrodes by a film-forming method.

8. A thermal head for thermal recording, comprising:
a substrate;
heat-generating resistors formed on the substrate;
electrodes electrically coupled to the heat-generating resistors for supplying electric power to the heat-generating resistors; and
a protecting film covering the heat-generating resistors and electrodes, wherein the protecting film is formed as a dense film consisting essentially of an overall composition represented by the following formula:
$Ta_xSiN_yO_z$, wherein
$0.3 \leq x \leq 0.7$,
$0.2 \leq y \leq 1.2$.
$0.5 \leq z \leq 1.5$, and wherein $3y+2z-nx=4$ and $2 \leq n \leq 5$; and
an undercoat film consisting essentially of a composition of silicon oxynitride, the undercoat film being formed between the protecting film and the heat-generating resistors and electrodes.

9. A thermal head as set forth in claim 8, wherein the silicon oxynitride composition of the undercoat film is approximately represented by the following formula:
$SiN_\alpha O_\beta$ wherein
$0.2 \leq \alpha \leq 1.1$
$0.3 \leq \beta \leq 1.8$ and $3\alpha+2\beta=4$.

10. A thermal head as set forth in claim 8, wherein the undercoat film has a thickness of 200 angstroms to 1 micron.

11. A thermal head as set forth in claim 8, wherein the undercoat film is formed by sputtering a member selected from the group consisting of silicon nitride and silicon oxynitride, and the protecting film is formed by co-sputtering (i) a member selected from the group consisting of tantalum and tantalum oxide and (ii) at least one member selected from the group consisting of silicon nitride and silicon oxynitride.

12. A thermal head for thermal recording according to claim 8, wherein the values of x, y and z are uniform throughout the thickness of the protecting film.

13. A thermal head for thermal recording according to claim 8, wherein the values of x, y and z vary at different points of thickness within the protecting film.

* * * * *